United States Patent [19]

Coleman

[11] Patent Number: 4,466,045

[45] Date of Patent: Aug. 14, 1984

[54] ADJUSTABLE MONOLITHIC CERAMIC CAPACITOR

[75] Inventor: James H. Coleman, Wichita Falls, Tex.

[73] Assignee: Sprague Electric Company, North Adams, Mass.

[21] Appl. No.: 511,416

[22] Filed: Jul. 6, 1983

[51] Int. Cl.$^3$ .......................... H01G 5/24; H01G 4/34
[52] U.S. Cl. ..................................... 361/277; 361/321
[58] Field of Search ........................ 361/306, 308–310, 361/320, 321, 313, 277

[56] References Cited

U.S. PATENT DOCUMENTS 3,586,933  6/1971  Bonini ............................. 361/321
3,898,541  8/1975  Weller ............................. 361/321
4,074,340  2/1978  Leigh ............................. 361/321

Primary Examiner—Donald A. Griffin

[57] ABSTRACT

A monolithic ceramic capacitor has at least two main buried electrodes extending to opposite ends of the ceramic body. Two auxiliary electrodes of smaller dimensions are buried between the two main electrodes and extend to one or both sides of the body. Conductive terminations may be applied to the surfaces of the body so that the capacity measured between the opposite body ends is close to a desired nominal value. This is accomplished by choosing or not choosing to apply termination portions for connecting each auxiliary electrode to a main electrode.

5 Claims, 4 Drawing Figures

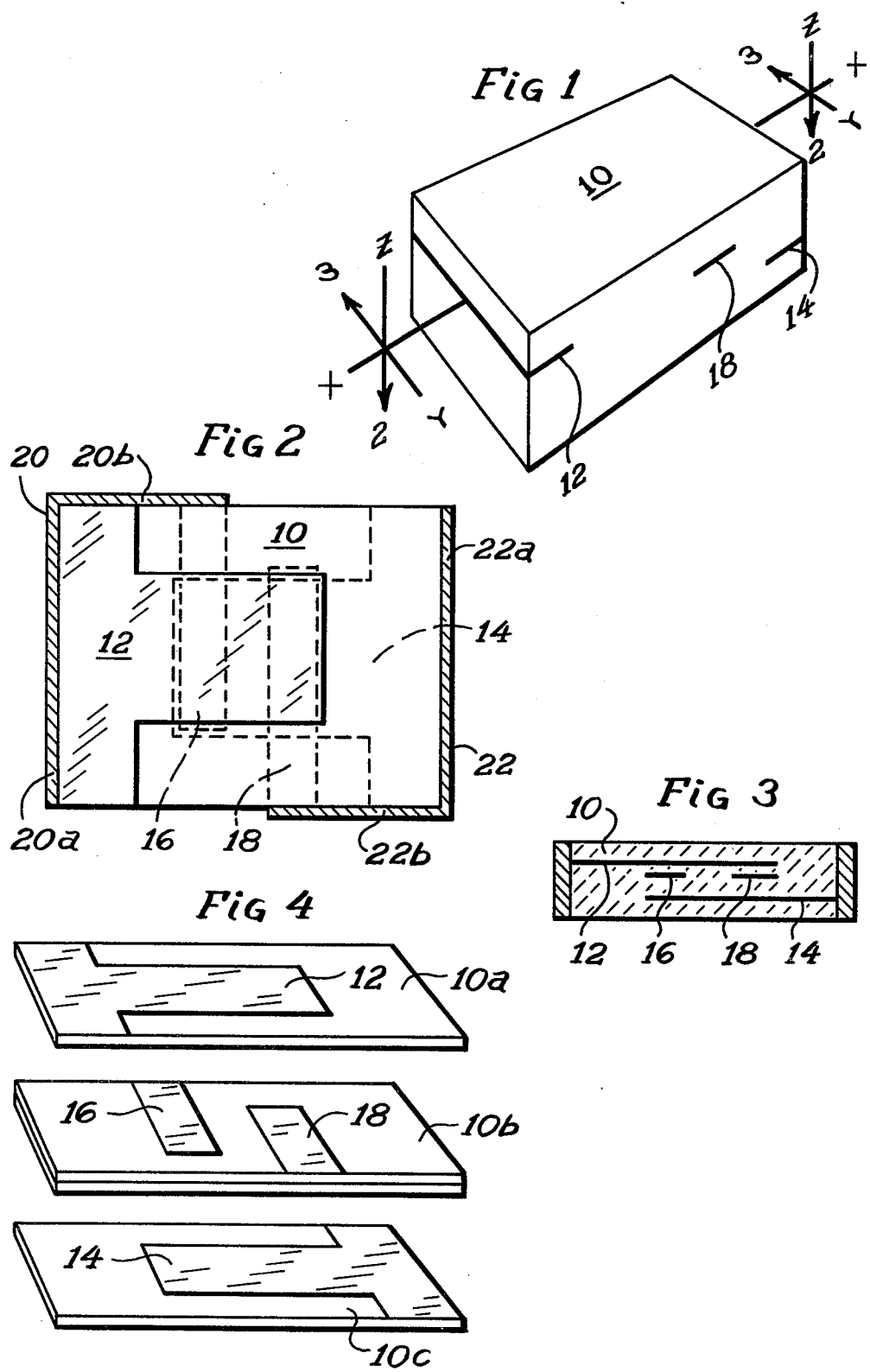

ADJUSTABLE MONOLITHIC CERAMIC CAPACITOR

BACKGROUND OF THE INVENTION

This invention relates to monolithic ceramic capacitors having a pair of main electrodes extending to opposite ends of a very small capacitor body, and more particularly to such capacitors having at least two auxiliary electrodes between the main electrodes.

Monolithic ceramic capacitors consist of a dielectric ceramic body typically having two groups of main electrodes buried therein. One electrodes-group extends to a separate side other than the other group to permit termination and provide electrical access. The electrical capacity so obtained is a function of many variables. Major variables are dielectric thickness between adjacent electrodes, dielectric constant K of the ceramic, and registration between adjacent electrodes. It is not unusual for capacity values of a production lot to vary 40%.

Misregistration between adjacent electrodes can be eliminated as a source of variation in capacitance by designing the electrode patterns so that there is a constant predetermined area of overlap between adjacent electrodes as is described in my patent, U.S. Pat. No. 3,896,354 issued July 22, 1975 that is assigned to the same assignee as is the present invention.

Also, when tighter capacitance tolerances are desired than obtainable in a given process, it is known to abrade a cavity in the body, removing central portions of some of the electrodes and surrounding ceramic to reduce the capacity to the desired value. Such a technique is described by W. Hatch in U.S. Pat. No. 3,456,170 issued July 15, 1969 and assigned to the same assignee as is the present invention. However, the abrading technique is not practical for use with very small capacitors wherein the electrodes overlap area is small compared to that of the capacitor body profile.

Another technique for adjusting capacity includes providing several auxiliary electrodes that extend to yet another surface of the ceramic body. These auxiliary electrodes are buried between two main electrodes that extend to the same main terminal of the capacitor and, when connected externally to the other main terminal of the capacitor, the capacitance increases.

It is an object of this invention to provide an alternative method for adjusting the capacitance value of a monolithic ceramic capacitor.

It is a further object to provide an improved adjustable monolithic ceramic capacitor applicable to capacitors of very small size.

SUMMARY OF THE INVENTION

A monolithic ceramic capacitor has two main sheet electrodes buried in a dielectric ceramic body. The two main electrodes are spaced apart by a central layer of the body. The two main electrodes extend, respectively, to two opposite ends of the body and overlap each other in a region that is spaced from the two opposite ends as well as two side edges of the body. Thus the area of overlap can be substantially less than the maximum possible area and preferably less than 33%. At least two spaced apart auxiliary sheet electrodes are buried in the central ceramic layer between the main electrodes and extend to one or one and another of the aforementioned side edges.

Thus the capacitance, that is measured between the main electrodes accessible at the opposite body ends, increases when any one of the auxiliary electrodes is connected to either one of the main electrodes.

BRIEF DESCRIPTION OF THE DRAWING

FIG. 1 shows a perspective view of an adjustable monolithic ceramic capacitor of this invention.

FIG. 2 shows a top sectional view of the capacitor of FIG. 1 taken in plane X-Y as seen in direction 2.

FIG. 3 shows a side sectional view of the capacitor of FIG. 1 taken in plane X-Z looking in direction 3.

FIG. 4 shows in exploded view three of the ceramic layers with deposited electrodes which layers are stacked and fired to form the capacitor of FIG. 1.

DESCRIPTION OF THE PREFERRED EMBODIMENTS

The ceramic capacitor illustrated in FIGS. 1, 2, 3 and 4, has a dielectric ceramic body 10 having buried therein two main electrodes 12 and 14. Electrode 12 lies in plane X-Y and has the shape of a T. Electrodes 12 and 14 overlap in a central region of the body where essentially all of the electrical capacity between them is developed. A pair of auxiliary electrodes 16 and 18 are buried in the dielectric ceramic in the above-noted overlap region between the two main electrodes 12 and 14. This body 10 is 0.080 inches long (in the X-direction) and 0.050 inches wide (in the Y-direction). The active-capacity overlap area is thus a small part of the total area of the X-Y plane that lies within body 10, namely about 18% so that adequate spaces are provided between electrodes (e.g. between 16 and 18, and between 18 and 14) to avoid inadvertent shorting when applying external terminations 20 and 22. This invention is especially concerned with small monolithic ceramic capacitors wherein the active overlap region is no more than one third the maximum possible area represented by the total area of a main-electrode within the ceramic body.

Using a ceramic material having a dielectric constant K of about 70, and a dielectric spacing between the main electrodes 12 and 14 of 3 mils (0.003 inch or 0.076 mm), the capacity between main electrodes 12 and 14 is about 3.4 pf ($3.4 \times 10^{-12}$ farads), with the auxiliary electrodes disconnected and "floating" electrically (absent such connections as 20b and 22b).

The auxiliary electrodes 16 and 18 are spaced from main electrode 12 by about 1 mil (0.025 mm) and are spaced from main electrode 14 by about 2 mils (0.051 mm). If either auxiliary electrode 16 or 18 is connected to main electrode 14, the capacity as seen between terminations 20 and 22 increases from 3.4 pf to 4.0 pf. On the other hand if either auxiliary electrode 16 or 18 is connected to main electrode 12, the capacity as seen between terminations 20 and 22 increases from 3.4 pf to 5.7 pf. The possible capacity values obtainable by permutating the auxiliary electrode connections are shown in Table I below:

TABLE I

| Permutation | Auxiliary Electrode Connections | Capacity (pf) |
| --- | --- | --- |
| 1 | none | 3.4 |
| 2 | 18-14 | 4.0 |
| 3 | 18-16-14 | 4.5 |
| 4 | 16-12 | 5.7 |
| 5 | 16-12 and 18-14 | 6.2 |

TABLE I-continued

| Permutation | Auxiliary Electrode Connections | Capacity (pf) |
| --- | --- | --- |
| 6 | 18-16-12 | 7.9 |

The aforementioned prior art capacitor also uses laterally extending auxiliary electrodes buried between two main electrodes, but there the main electrodes are connected to the same body end and thus will assume the same potential (voltage). Such a capacitor would result if for example electrode 14 in FIG. 3 were shifted leftward so both main electrodes connect to the same leftward termination. A change in capacity from zero to 5.1 pf to 10.2 pf then occurs as first neither auxiliary electrode, then auxiliary electrode 16 and finally electrode 18 are connected to the opposite potential. These are the only permutations possible.

Thus capacitors of this invention provide more and finer steps of adjustment for a given number of auxiliary electrodes as is exemplified in Table I.

Capacitors of this invention may be made by any of the well known methods. Briefly, a slurry of ceramic powder is formed in a liquid medium consisting of xylene as a vehicle, methylmethacrylate as a binder and a surfactant such as lecithin. Successive coatings of the ceramic slurry are deposited on a substrate, drying each coating before depositing the next. On some of the dried coatings a pattern of a palladium containing electroding ink is screen printed. This stack is then fired to maturity at from 1000°-1400° C. in air. The edges and ends to which electrodes extend may be abraded to more fully expose the electrodes and a silver containing paint is applied to those ends and edges. The body is then fired at about 760° C. to cure the silver paint and form conducting terminations, e.g. 20a, 20b, 22a and 22b that each contact certain of the buried electrodes, e.g. 12, 16, 14 and 18 respectively.

In the application of terminations to the body 10, one may elect to apply one or both or neither termination portions 20b and 22b. Such election may be made for a production batch of capacitor bodies having a tight spread of capacities. Alternatively, terminations may be fully applied as shown in FIG. 2 and whereafter portions of one or both terminations 20 and 22 may be severed to cause one or both auxiliary electrodes 18 and 16 to float electrically, thus eliminating their influence on the capacitance value. For example, to disconnect auxiliary electrode 18, a center region of termination portion 22b may be severed.

As a third alternative, and in most cases the most attractive, only termination portions 20a and 22a are applied to all the bodies. These end terminated bodies can then be tested and classified by capacity in a number of groups. For each group, termination portions 20b and 22b are applied as needed to make all capacities close in value to a desired nominal capacity.

What is claimed is:

1. A monolithic ceramic capacitor comprising a ceramic body, at least two main sheet electrodes buried in said body and spaced apart by a central layer of said ceramic body one of said main electrodes extending to one end of said body and the other of said main electrodes extending to the opposite end of said body, said two main electrodes having a region of overlap that is spaced from said body ends and the two side edges of said body; and at least two spaced apart auxiliary sheet electrodes buried in said central ceramic layer and extending to at least one of said side body edges, whereby the capacitance as measured at said opposite body ends between said two main electrodes increases when any one of said auxiliary electrodes is electrically connected to either one of said main electrodes.

2. The capacitor of claim 1 wherein said two auxiliary electrodes lie in the same plane and extend, respectively, to the opposite of said side body edges.

3. The capacitor of claim 1 wherein the space between said auxiliary electrodes and one of said main electrodes is less than the space between said auxiliary electrodes and the other of said main electrodes.

4. The capacitor of claim 1 wherein said overlap region of said two main electrodes occupies less than one third maximum possible area represented by the total area of a main-electrode plane within said body.

5. The capacitor of claim 1 wherein the portions of said main electrodes at said overlap region are spaced from said side body edges but the extending portions of said main electrodes at said opposite body ends extend also to said side body edges so that each of said main electrodes has the shape of a T and a planar metal termination film may connect any one of said auxiliary electrodes to one of said main electrodes without the necessity of conforming to a body corner.

* * * * *